United States Patent [19]

Yasuda

[11] Patent Number: 4,845,572
[45] Date of Patent: Jul. 4, 1989

[54] MULTIPLIED-SPEED REPRODUCING SYSTEM IN INFORMATION REPRODUCING APPARATUS

[75] Inventor: Shigeru Yasuda, Saitama, Japan

[73] Assignee: Pioneer Electronic Corporation, Tokyo, Japan

[21] Appl. No.: 102,708

[22] Filed: Sep. 30, 1987

[30] Foreign Application Priority Data

Sep. 30, 1986 [JP] Japan ................................ 61-232653

[51] Int. Cl.$^4$ ............................................. H04N 5/76
[52] U.S. Cl. ................................... 358/342; 358/335; 358/327; 358/313; 360/10.1
[58] Field of Search ............... 358/342, 327, 313, 335; 360/10.1

[56] References Cited

U.S. PATENT DOCUMENTS 4,751,588 6/1988 Tsujimura ......................... 358/342

Primary Examiner—L. T. Hix
Assistant Examiner—D. Rutledge
Attorney, Agent, or Firm—Sughrue, Mion, Zinn, Macpeak & Seas

[57] ABSTRACT

A multiplied speed reproducing apparatus for performing reproduction at a multiplied speed by alternately reading information into a video memory for repeated reading out and track jumping. The contents of the video memory are renewed for at least one field of video information existing between two synchronizing pulses following a fixed circumferential position of the disk and then the tracks are jumped.

3 Claims, 3 Drawing Sheets

MULTIPLIED-SPEED REPRODUCING SYSTEM IN INFORMATION REPRODUCING APPARATUS

DETAILED DESCRIPTION OF THE INVENTION

1. Field of the Invention

The present invention relates to a multiplied-speed reproducing system in an information reproducing apparatus having a video memory for storing video information.

2. Background of the Invention

Recording disks include CAV (constant angular velocity) disks and CLV constant linear velocity) disks. In a CAV disk a fixed quantity of information, that is, for example, video information of one frame, is recorded on every track of one circumference regardless of the radial position of the track on the disk. Portions of each track which contain information corresponding to a vertical synchronizing signal and which are located at every boundary between two adjacent recorded frames are aligned on a radially extending straight line. Accordingly, in the CAV disk, no fluctuation occurs during the period of the synchronizing signal of the reproducing video signal just after a jump operation, so that special reproduction such as still-picture reproduction or the like can be well performed.

In the case of the CLV disk, however, the quantity of information recorded on a track of one circumference on the disk varies depending on the radial position of the track on the disk. For example, video information for one frame is recorded on a track at the innermost circumference of the disk, while video information for three frames is recorded on a track at the outermost circumference of the disk. In the CLV disk, therefore, the spatial periods of the synchronizing signal of the video signal obtained just after the jump operation vary from track to track. Accordingly, an information reproducing apparatus has been proposed in which there is provided a video signal for one frame or for one field. The video signal is converted into a digital signal by a clock synchronized with a reproduced video signal so that the digital signal is written in a predetermined position of the video memory and the written signal is read out by a stable external clock.

In such an information reproducing apparatus, multiplied-speed reproduction can be performed by alternately performing a track jump operation and a playing operation by an information detecting point of a pickup. At that time, video information for one field or for one frame obtained after production of a rotation signal generated every rotation of the disk is written in the video memory. The written information in the video memory is repeatedly read to be output so that the multiplied-speed reproduction having no picture distortion can be performed.

In such an apparatus, however, the quantity of information recorded on a track located on the outer circumferential side of the CLV disk is larger than that recorded on another track located on the inner circumferential side of the disk, so that there is a possibility that many fields cannot be reproduced in the vicinity of the outermost circumference and not only is it impossible to obtain a video display having smooth movement but a desired picture cannot be searched through the multiplied-speed reproduction.

SUMMARY OF THE INVENTION

It is therefore an object of the present invention to eliminate the above disadvantages in the prior art.

In particular, it is an object of the present invention to provide a multiplied-speed reproducing system in an information reproducing apparatus having a video memory, in which a video display having smooth movement can be obtained and a desired picture can be surely searched.

The multiplied-speed reproducing system according to the present invention is characterized in that it is detected whether or not the information detecting point has passed over a straight line extending on a recording surface of the recording disk in a predetermined direction from a center of the recording disk. The storage contents of the video memory are renewed with video information obtained from the recording disk in a period from a point in time when a vertical synchronizing signal in information read out from the recording disk has been detected to a point in time when video information of at least one field obtained next to the vertical synchronizing signal after detection of passage of the information detecting point over the straight line has been completely read out. Information stored in the video memory is read out repeatedly during the track jumping operation and during the playing operation so as to be output as reproduced information.

DETAILED DESCRIPTION OF THE PREFERRED EMBODIMENT

Figure 1:
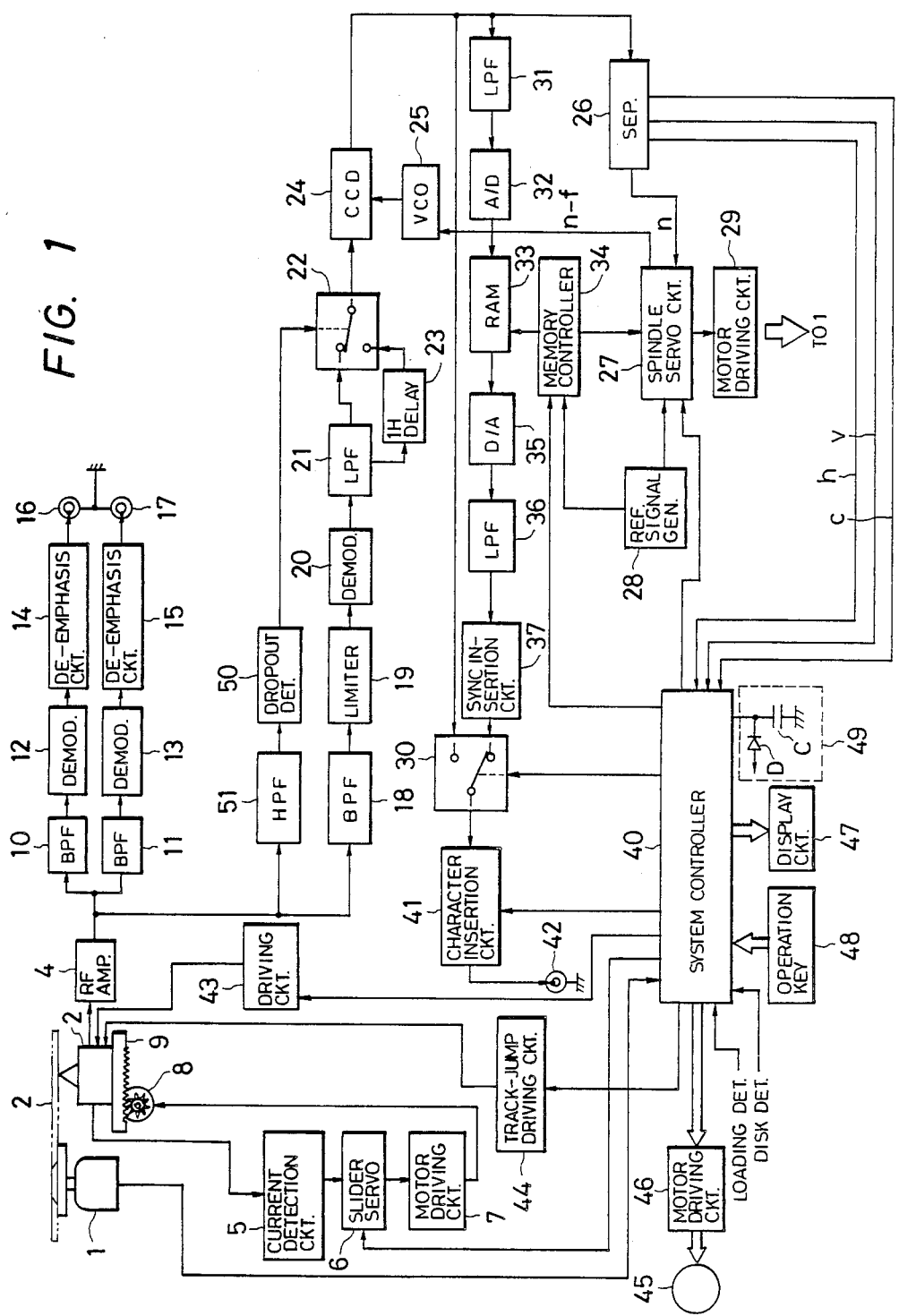
FIG. 1 is a block diagram showing an information reproducing apparatus employing the system according to the present invention.

Referring to the drawings, an embodiment of the present invention will be described hereunder in detail.

In FIG. 1, a disk 2 is driven to rotate by a spindle motor 1 so that information recorded on the disk 2 is read out by an optical pickup 3. A signal generating device for generating a rotation signal every revolution of the spindle motor 1 is incorporated in the spindle motor 1. The signal generating device is fixed to, for example, a rotary shaft of the spindle motor 1 and is provided with a rotary disk having a single slit formed in its circumferential edge. The signal generating device is arranged to illuminate the circumferential edge of the rotary disk so that a rotation signal is generated when the light passed through the single slit is received by a light reception element.

A laser diode, an objective lens, a focus actuator, a tracking actuator, a photo detector, etc. are incorporated in the pickup 3. The output of the pickup 3 is applied not only to an RF amplifier 4 but to a focus servo circuit (not shown) and a tracking servo circuit (not shown). The focus actuator and the tracking actuator in the pickup 3 are driven by the focus servo circuit and the tracking servo circuit respectively so that laser light emitted from the laser diode in the pickup 3 is focused on a recording surface of the disk 2 so as to form an information detecting light spot or an information detecting point. The position of the light spot in the radial direction of the disk 2 is controlled so as to be positioned on a track formed on the recording surface of the disk 2.

Further, a coil current supplied to a coil for driving the tracking actuator in the pickup 3 is supplied to a current detection circuit 5. A current detecting signal produced from the current detection circuit 5 in response to the coil current is applied to a slider servo circuit 6 so as to be amplified and subjected to phase compensation. An output of the slider servo circuit 6 is applied to a slider motor 8 through a motor driving circuit 7 so as to drive the slider motor 8. A slider 9 on which the pickup 3 is mounted and which is movable in the radial direction of the disk is driven by the slider motor 8 so that the tracking actuator in the pickup 3 is controlled to be located at an intermediate position in a movable rang of the coil-based tracking actuator.

On the other hand, an RF signal produced from the RF amplifier 4 is applied to BPFs (band-pass filters) 10 and 11 so that audio FM signals of left and right channels are separately extracted from the applied signal. The two-channel audio FM signals are applied to FM demodulators 12 and 13 respectively so that two-channel audio signals are reproduced. The two-channel audio signals are applied to de-emphasis circuits 14 and 15 respectively so that the components thereof which were emphasized in recording are returned to their original levels. Audio signals produced from the de-emphasis circuits 14 and 15 are applied to audio output terminals 16 and 17 respectively.

Further, the RF signal produced from the RF amplifier 4 is applied to a BPF 18 so as to separately extract a video FM signal. The video FM signal is limited in its amplitude by a limiter 19 and then applied to an FM demodulator 20 in which a video signal is reproduced. The reproduced video signal is applied to one input terminal of a drop-out compensation change-over switch 22 through an LPF (low-pass filer) 21. The video signal delayed by a 1H delay line 23 ("1H" representing one horizontal synchronization period) is applied to the other input terminal of the change-over switch 22. A drop-out detecting signal produced from a drop-out detection circuit 50 is applied to the change-over switch 22 as a control signal. A high frequency band component of the RF signal separately extracted by an HPF (high-pass filter) 51 is applied to the drop-out detection circuit 50. The drop-out detection circuit 50 is arranged to detect a drop-out on the basis of, for example, a zero-crossing point of the high-frequency band component of the RF signal to thereby generate a drop-out detecting signal. The signal change-over operation of the change-over switch 22 is controlled by the drop-out detecting signal. Upon the occurrence of a drop-out, a video signal of 1H before, which is produced from the 1H delay line 23, is selectively passed through the change-over switch 22 to thereby compensate the drop-out.

The video signal produced from the change-over switch 22 is applied to a CCD (change coupled device) 24. A clock signal produced from a VCO (voltage controlled oscillator) 25 is applied to the CCD 24. The video signal is delayed in the CCD 24 by a time period determined in response to the frequency of the clock.

The video signal produced from the CCD 24 is applied to a separation circuit 26. The separation circuit 26 is arranged to separate a horizontal synchronizing signal h, a vertical synchronizing signal v, and control data c such as a Phillips code or the like, from the video signal. The horizontal synchronizing signal h produced from the separation circuit 26 is applied to a spindle servo circuit 27. The spindle servo circuit 27 compares the phase of the horizontal synchronizing signal h with that of a reference signal of a predetermined frequency produced from a reference signal generating circuit 28 to thereby produce a spindle error signal corresponding to the phase difference between the horizontal synchronizing signal and the reference signal. The spindle error signal is applied to a motor driving circuit 29 so as to control the rotating speed of the spindle motor 1. At the same time, a control signal corresponding to the phase difference between the horizontal synchronizing signal h and the reference signal is produced and applied to a control input terminal of the VCO 25. Then, the oscillation frequency of the VCO 25 is made to correspond to the phase difference between the horizontal synchronizing signal h and the reference signal and the signal delay time of the CCD 24 is changed in accordance with the phase difference, so that the error in the time base is eliminated.

The video signal in which the time base error has been eliminated by the CCD 24 is applied to one input terminal of a change-over switch 30 as well as through an LPF 31 to an A/D (analog-to-digital) converter 32. In the A/D converter 32, the video signal is sampled every predetermined period and the thus obtained sampled values are successively converted into digital data. The output data of the A/D converter 32 is applied to an RAM 33 acting as a video memory. The address control and mode control of the RAM 33 are performed by a memory control circuit 34. The memory control circuit 34 is arranged to successively read out the data written at addresses of the RAM 33 in accordance with the clock signal produced from the reference signal generating circuit 28 and to control the RAM 33 so that the contents of each of its address are rewritten in response to a write enable signal w. The data read out of the RAM 33 is applied to a D/A converter 35 so as to be converted into an analog signal. The output of the D/A converter 35 is applied through an LPF 36 to a sync insertion circuit 37 in which a synchronizing signal is added to the output of the D/A converter 35 to thereby reproduce a video signal. The video signal reproduced by the sync insertion circuit 37 is applied to the other input terminal of the change-over switch 30. A change-over control signal produced from a system controller 40 is applied to the change-over switch 30. A selected one of the video signal applied to the change-over switch 30 through the RAM 33 and the video signal applied to the change-over switch 30 directly from the CCD 24 is applied to a character insertion circuit 41. The character insertion circuit 41 is arranged to combine a video signal corresponding to characters indicated by data sent from the system controller 40 and the video signal produced from the change-over circuit 30 with each other. The video signal produced from the character insertion circuit 41 is applied to a video output terminal 42.

The system controller 40 is constituted by a microcomputer system composed of a processor, a ROM, a RAM, etc. Signals are applied to the system controller 40, such as the rotation signal produced from the spindle motor 1, the synchronizing signals and the control data produced from the separation circuit 26, data corresponding to the key operation of an operation key 48, a loading detecting signal produced from a loading mechanism, a disk detecting signal, and the like. In the system controller 40, the processor processes the input signals in accordance with a program previously stored in the ROM so as to control the slider servo circuit 6, the spindle servo circuit 27, the change-over switch 39, the memory control circuit 34, the character insertion circuit 41, a driving circuit 43 for driving a laser diode, a track-jump driving circuit 44 for driving the tracking actuator in response to a jump command, a motor driving circuit 46 for driving a motor 45 of the disk loading mechanism, a display circuit 47, etc. A power source Vcc is supplied to a power supply terminal of the system controller 40 through a diode D. The power supply terminal of the system controller 40 is connected to ground through a capacitor C. A power backup circuit 49 is constituted by the diode D and capacitor C so that electric power is supplied to the system controller 40 even when a power source is temporarily turned off.

Figure 2:
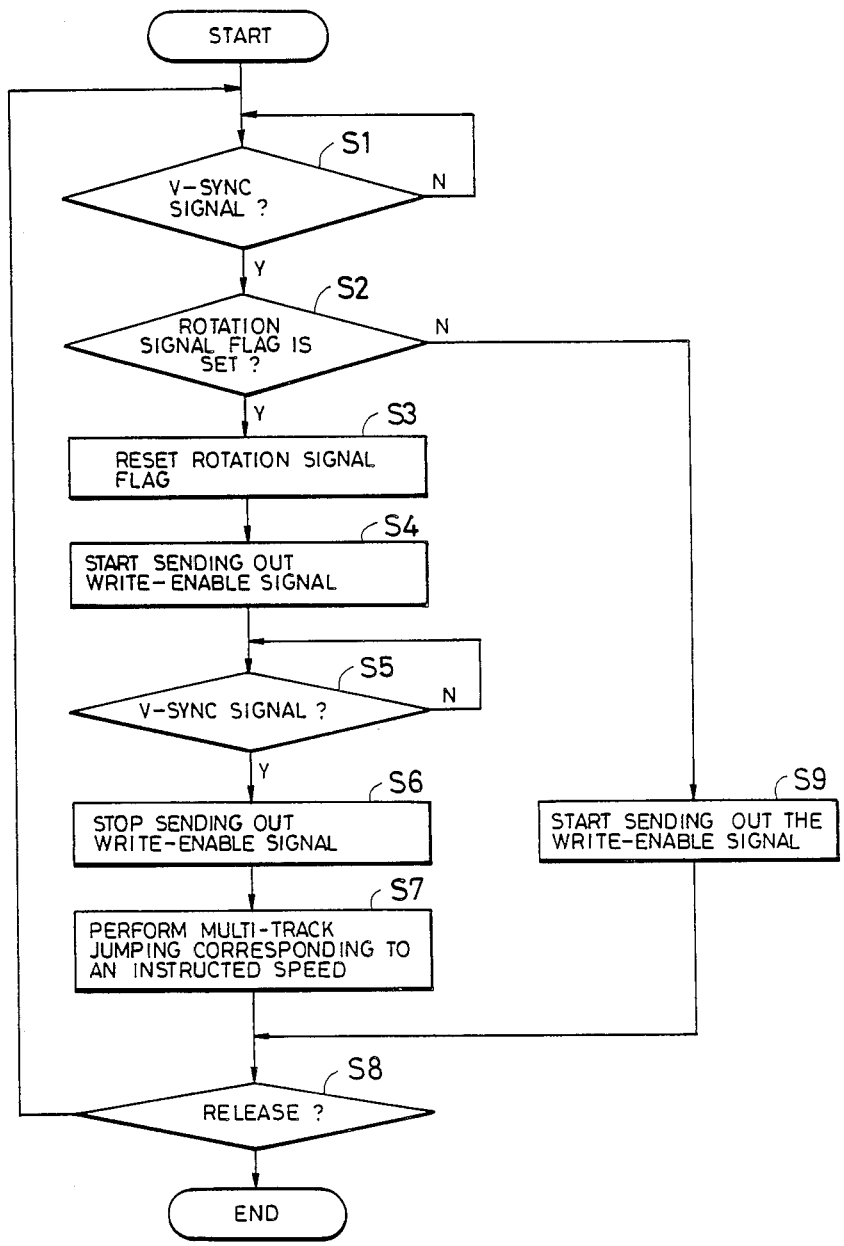
FIG. 2 is a flowchart showing the operation of the apparatus of FIG. 1.

Referring to a flowchart of FIG. 2, the operation of the processor in the system controller 40 in the arrangement described above will be described.

If a multiplied-speed reproducing command is generated by a key operation by a user while a play operation is being performed by execution of a main routine, or the like, the operation of the processor is shifted to step S1 in which judgement is made as to whether a vertical synchronizing signal v is produced from the separation circuit 26. In step S1, if it is proved that a vertical synchronizing signal v is not produced, the processor repeats the execution of step S1. Only when it is proved that a vertical synchronizing signal v is produced, the operation of the processor shifts to step S2 in which judgement is made as to whether or not a flag showing the fact that a rotation signal is produced (hereinafter simply referred to "rotation signal flag") is set. The rotation signal flag refers to a fixed circumferential position of the disk 2 having passed a detector.

In step S2, if it is proved that a rotation signal flag generated from a frequency generator (not shown) in spindle motor is set, the operation of the processor is shifted to step S3 so as to reset the rotation signal flag. Thereafter, the operation of the processor shifts to step S4 to start sending out a write-enable signal. The write-enable signal causes the digitized video signal from the disk 2 to be written into the RAM 33. Then, the operation of the processor shifts to step S5 so as to judge whether a vertical synchronizing signal v is not produced, the processor repeats the execution of step S5, while only when it is proved that a vertical synchronizing signal v is produced, the operation of the processor is shifted to a step S6 so as to stop sending the write-enable signal w. Next, the operation of the processor shifts to step S7 so as to send a command to the track-jump driving circuit 44 so that the track-jump driving circuit 44 causes the information detecting point to perform multi-track jumping, that is, to jump tracks of the number corresponding to an instructed reproducing speed. The multi-track jumping is performed, for example, by repeatedly sending out 1-track jump commands the number of times corresponding to the instructed reproducing speed at the rate of once per msec. For example, the 1-track forward jump command is sent out n−1 times when forward reproduction at n-times speed is instructed, while the 1-track reverse jump command is sent out n times reverse reproduction at n-times speed is instructed.

Then, the operation of the processor is shifted to step S8 so as to judge whether a command for stopping the multiplied-speed reproducing operation is produced or not. In step S8, if it is proved that the multiplied-speed reproducing operation stop command is produced, the processor starts again the execution of the main routine. When it is proved in the step S8 that the stopping command is not produced, the processor executes steps S1 et seq.

When it is proved in the step S2 that the rotation signal flag is not set, the operation of the processor is shifted to step S9 so as to start the sending-out of the write-enable signal and then shifted to the step S8.

Figure 3:
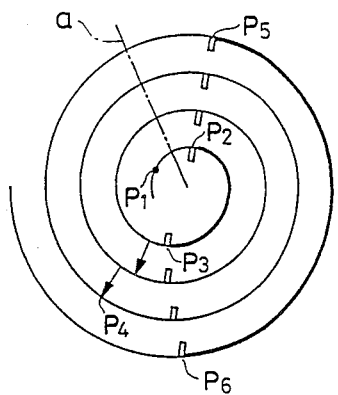
FIG. 3 is a diagram showing movement of the information detecting light spot of the pickup in the vicinity of the innermost circumference of a disk in the apparatus of FIG. 1.
Figure 4:
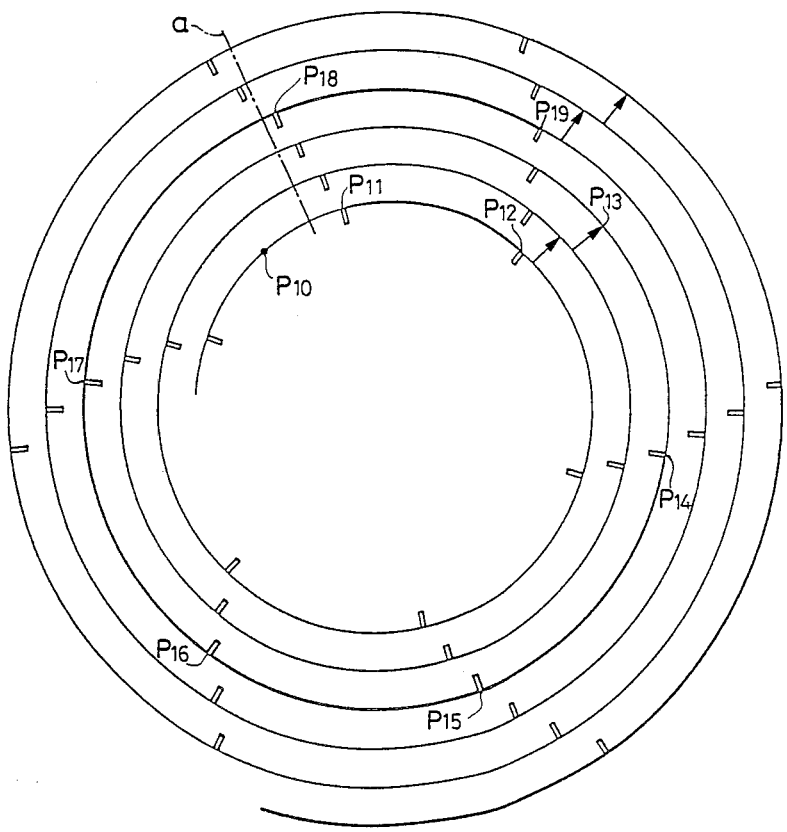
FIG. 4 is a diagram showing movement of the information detecting light spot of the pickup in the vicinity of the outermost circumference of the disk in the apparatus of FIG. 1.

Referring to FIGS. 3 and 4, description will be made as to the operation of the system according to the invention actuated by the operation of the system according to the invention actuated by the operation of the processor described above. In FIG. 3, recording tracks in the vicinity of the innermost circumference of a CLV disk is shown by a solid line, and in FIG. 4, recording tracks in the vicinity of the outermost circumference of the CLV disk is shown by a solid line. Vertical synchronizing signals are recorded at the positions shown by rectangular projections of the recording tracks. Assume that the disk is clamped at such a position that a rotation signal is produced when a information detecting light spot is passed, by the rotation of the disk, over a one-dotted chain line a extending from a rotational center of the disk in a predetermined direction on a recording surface of the disk.

Assuming now that reproduction at a multiplied speed which is three times as high as a normal one is instructed when the information detecting light spot of the pickup 3 is moved along a track to reach a position $P_1$ in a play operation. The light spot is then further moved on the track so as to pass over the one-dotted chain line a. When the light spot passes over the one-dotted chain line a, the rotation signal flag is set by unshown circuitry inputting to the system controller 40. Accordingly, when the light spot has reached a position $P_2$ where a vertical synchronizing signal is recorded after the light spot has passed over the one-dotted chain line a, the write-enable signal w is started to be sent in the step S4. The write-enable signal w is continuously sent until the light spot reaches a position $P_3$ where the next vertical synchronizing signal is recorded so that video information of 1 field is written in the RAM 33. When the light spot has reached the position $P_3$, the write-enable signal w is stopped being sent, the one-track jumping is performed two times as shown by two arrows so that the light spot reaches a position $P_4$.

Then, similarly to the operation described above. video information of 1 field recorded on a thick line portion of the track between positions $P_5$ and $P_6$ where vertical synchronizing signals are recorded is written in the RAM 33 so as to renew the storage contents in the RAM 33.

As described above, in the vicinity of the innermost circumference where video information of about 1 field is recorded on a track of one circumference, the storage contents in the RAM 33 are renewed by the video information of 1 field in the playing operation.

Next, assuming that reproduction at a multiplied speed which is three times as high as a normal one is instructed when the light spot has reached a position $P_{10}$ in the vicinity of the outermost circumference of the disk 2, the light spot is further moved along the track to pass over the radial one-dotted chain line a. When the light spot has reached a position $P_{11}$ where a vertical synchronizing signal is recorded, a write-enable signal is started to be sent similarly to the case where the light spot reaches the position $P_3$. The write enable signal is continuously sent until the light spot reaches a position $P_{12}$ where the next vertical synchronizing signal is recorded, so that video information of 1 field is written in the RAM 33 to renew the storage contents of the RAM 33.

Then, one-track jumping is performed two times, so that light spot reaches a position $P_{13}$. The light spot is move again along the track from the position $P_{13}$ to a position $P_{14}$ where another vertical synchronizing signal is recorded. The rotation signal flag has been reset by the software in step S3 prior to the light spot having arrived at the position $P_{14}$ so that the write-enable signal w is started to be sent in step S9. Thereafter, the light spot passes over positions $P_{15}$, $P_{16}$ and $P_{17}$ where vertical synchronizing signals are recorded. The rotation signal flag remains reset also at the positions $P_{15}$, $P_{16}$ and $P_{17}$ so that the write enable signal w is not stopped being sent but is continuously sent. When the light spot passes over the one-dotted chain line a, the rotation signal flag is again set. Accordingly, when the light spot has reached a position $P_{18}$ where a vertical synchronizing signal is recorded after the light spot has passed over the one-dotted chain line a, the write-enable signal w is continuously sent in step S4. When the light spot reaches a position $P_{19}$ where the next vertical synchronizing signal is recorded, the write-enable signal w is stopped being sent in step S6.

Through the operation described above, the storage contents of the RAM 33 is rewritten with the video information of 5 fields recorded on the track portion from the position $P_{14}$ to the position $P_{19}$.

Thus, as described above, the storage contents of the RAM 33 are rewritten with the video information of plural fields in the vicinity of the outermost circumference on which video information of more than one frame is recorded on the track of one circumference.

As described above in detail, the multiplied-speed reproducing system according to the present invention is featured in that it is detected whether or not the information detecting point has passed over a straight line extending on a recording surface of the recording disk in a predetermined direction from a center of the recording disk, and storage contents of the video memory are renewed with video information obtained from the recording disk in a period from a point in time when a vertical synchronizing signal in information read out from the recording disk has been detected to a point in time when video information of at least one field obtained next to the vertical synchronizing signal after detection of passage of the information detecting point over the straight line has been completely read out. Accordingly, the storage contents of the video memory are rewritten with the video information of plural fields in the case where there is much information recorded on the track of one circumference, so that video having smooth movement can be obtained and a desired picture can be surely searched.

What is claimed is:

1. A multiplied speed reproducing apparatus, comprising:
    means for reading video information and synchronizing signals recorded on a rotating disk by positioning an information detecting point on a spiral track of said disk;
    means for detecting when said information detecting point has passed over a straight radial line of said rotating disk;
    means for detecting said synchronizing signals;
    means for instructing a multiplied speed of reproduction of said video information;
    means for jumping said information detecting point over a selected number of tracks of said spiral track;
    a video memory for storing said video information;
    first control means for renewing contents of said video memory with said video information read in a first period extending from a first point in time when a first synchronizing signal is detected after said information detecting point has passed over said straight radial line to a second point in time when at least one field of said video information following said first synchronizing signal has been read; and
    second control means for reading out from said video memory said video information during operation of said means for jumping for output as a video signal.

2. A multiplied speed reproducing apparatus as recited in claim 1, wherein said means for jumping jumps said information detecting point following said first period.

3. A multiplied speed reproducing apparatus as recited in claim 2, wherein said first control means renews said contents of said video memory in said first period between two first synchronizing signals after said information detecting point has passed over said straight radial line and in a subsequent second period after said operation of said means for jumping extending from a third point in time when a synchronizing signal is first detected after said operation of said means for jumping to a fourth point in time when a synchronizing signal is first detected after a subsequent detection of said information detecting point having passed over said straight radial line.

* * * * *